April 30, 1946.　　　　　J. G. FORD　　　　　2,399,338
METHOD OF LAMINATING POROUS SHEET MATERIALS
Filed July 7, 1944　　　　3 Sheets-Sheet 1
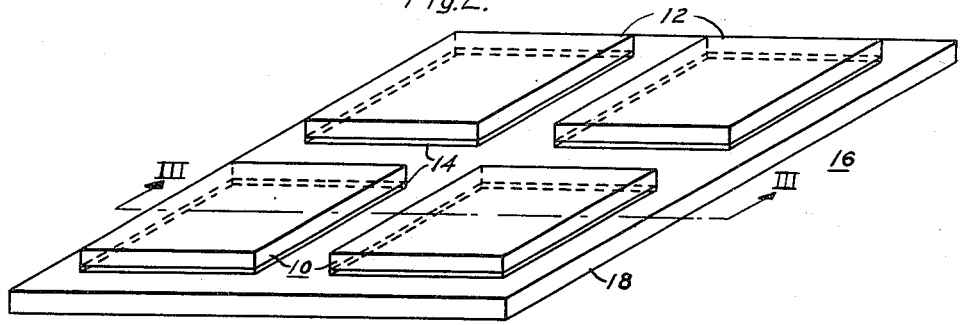
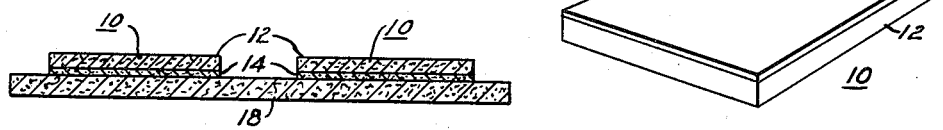
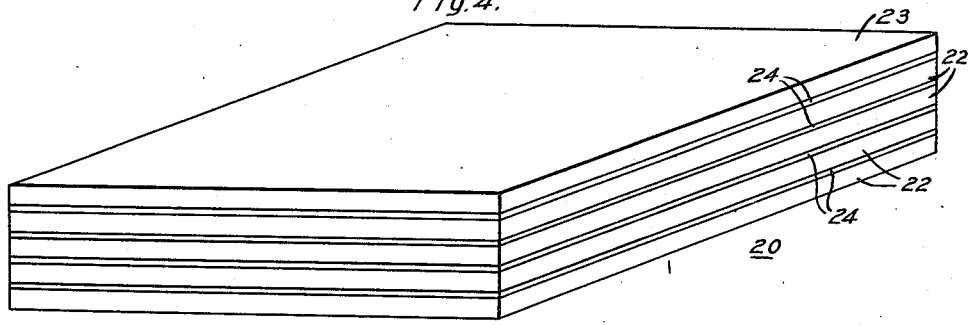
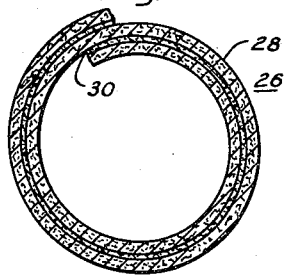
WITNESSES:
INVENTOR
James G. Ford.
BY
ATTORNEY April 30, 1946. J. G. FORD 2,399,338
METHOD OF LAMINATING POROUS SHEET MATERIALS
Filed July 7, 1944 3 Sheets-Sheet 2
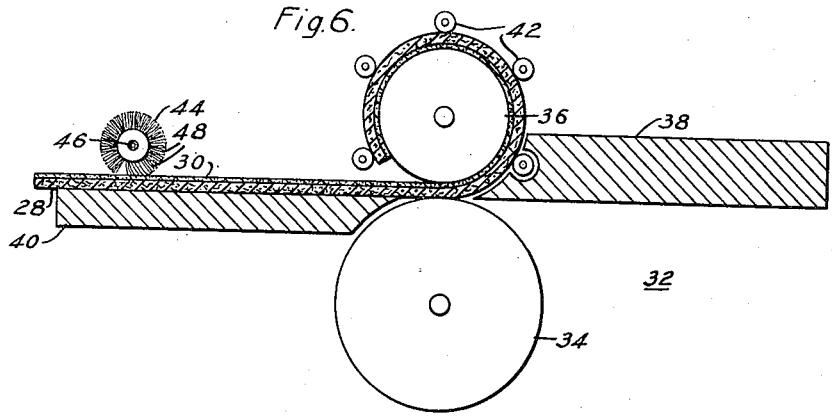
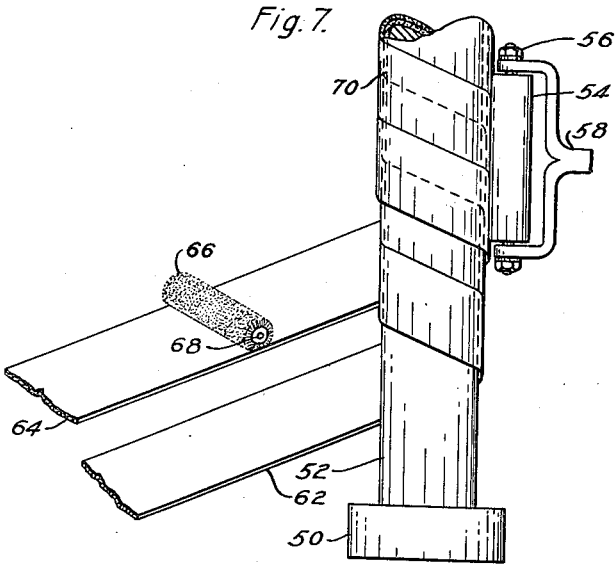
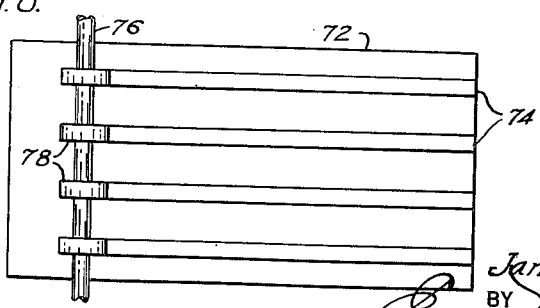
WITNESSES:
INVENTOR
James G. Ford.
BY
ATTORNEY

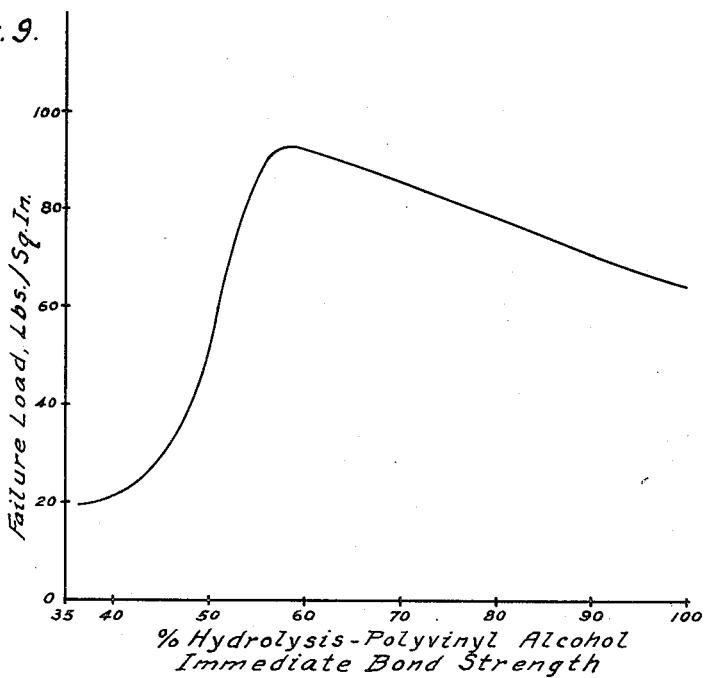
Fig. 9. — % Hydrolysis–Polyvinyl Alcohol / Immediate Bond Strength
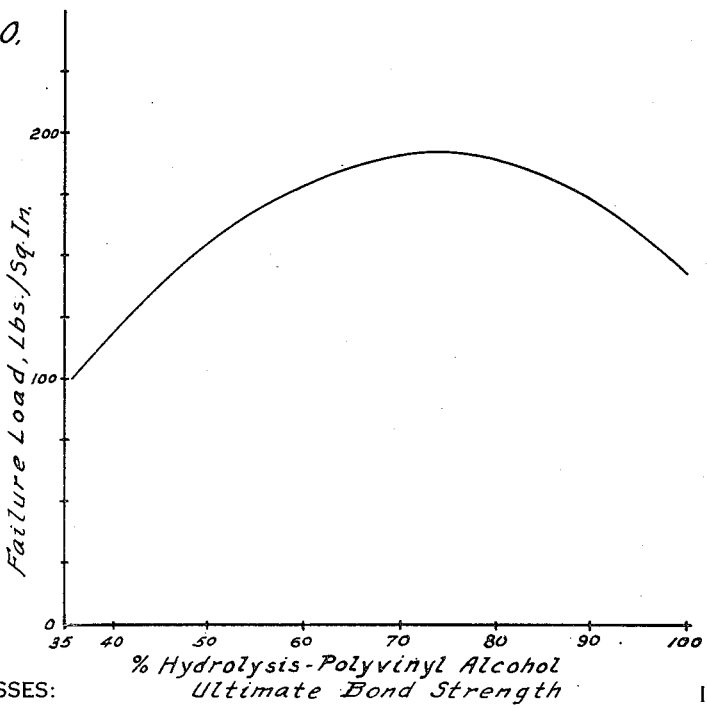
Fig. 10. — % Hydrolysis–Polyvinyl Alcohol / Ultimate Bond Strength Patented Apr. 30, 1946

2,399,338

UNITED STATES PATENT OFFICE 2,399,338

METHOD OF LAMINATING POROUS SHEET MATERIALS

James G. Ford, Sharon, Pa., assignor to Westinghouse Electric Corporation, East Pittsburgh, Pa., a corporation of Pennsylvania Application July 7, 1944, Serial No. 543,865

10 Claims. (Cl. 154—40)

This invention relates to laminated structures and more particularly, to laminated structures prepared from cellulosic materials.

This application is a continuation-in-part of patent application Serial No. 313,249, filed January 10, 1940, of James G. Ford, entitled Built-up insulators, and patent application Serial No. 361,346, filed October 16, 1940 of James G. Ford, entitled Bonded laminated structures, both assigned to the assignee of the present invention.

Heretofore, laminated or built-up structures such as paper tubes, multi-ply cardboard blocks, press board insulating members and the like, have been prepared by consolidating several layers of material with such common adhesives as glue, cellulose acetate or shellac applied between the layers. In preparing these laminated structures, the press board or paper was coated with a solution of the glue, for example, and stacked into the desired configuration. Thereafter, the stacked assembly was subjected to a high pressure and heated for a considerable period of time of the order of an hour or more to effect a permanent bonding of the whole. Expensive apparatus was required and the production rate was low.

Due to the low production rate, it was necessary to prepare beforehand and to keep large stocks of laminated members to meet industrial and commercial requirements. Paper mills, wood mills and other suppliers maintained large warehouses filled with laminated structures of various shapes in anticipation of future orders. The cost of the laminated member was increased to the consumer due to the extensive storage required.

In the prior art relating to the bonding of such laminated structures, there was no adhesive available that could be subjected to a simple cold pressing operation of short duration to effect a bond that was nearly as strong as the material being bonded when tested within a short time of the cold pressing operation.

The object of this invention is to provide for making laminated structures of predetermined shape by a simple pressing operation of short duration.

Another object of the invention is to provide precoated members carrying a dry coating of polyvinyl alcohol of an average hydrolysis of at least 50%, the coating being wettable to provide an adhesive that will respond to a pressing operation of short duration to bond laminated structures.

A further object of the invention is to provide for the precoating of sheet material with an adhesive which may be wetted whenever it is desired to prepare a laminated structure and which will respond to a cold pressing operation of short duration to bond a laminated structure built up from such sheets.

The invention accordingly comprises the several steps and the relation and order of one or more of such steps with respect to each of the others and the article possessing the features, properties and the relation of elements which are exemplified in the following detailed disclosure.

For a fuller understanding of the nature and objects of the invention, reference may be had to the following detailed description taken in conjunction with the accompanying drawings, in which:

Figure 1 is a perspective view of a precoated element;

Fig. 2 is a perspective view of a built-up structure suitable for use as an electrical insulator;

Fig. 3 is a sectional view taken on line III—III of Fig. 1;

Fig. 4 is a perspective view of a plurality of elements, such as shown in Fig. 3 consolidated into a single structure;

Fig. 5 is a sectional view of a tube;

Fig. 6 is an elevation view partly in section of a tube rolling mechanism;

Fig. 7 is a fragmentary plan view of another type of tube rolling mechanism;

Fig. 8 is a bottom plan view of an adhesive applying device; and

Figs. 9 and 10 are graphs plotting bond strength against the degree of hydrolysis of the polyvinyl alcohol.

Laminated members, of many shapes and sizes, particularly members made of cellulosic material, such, for example, as paper, cardboard, and press board, are required in industry. In electrical apparatus, for example, in transformers, a large quantity of built-up press board spacing and insulating structures of a great variety of dimensions and shapes is required. These built-up insulating structures consist in some cases of large sheets of material with smaller members applied thereto. In other cases, tubular press board members of large size are required. Such built-up structures are particularly useful for insulating the live portions of apparatus from the casing and for separating the electrical elements from one another. These press board members combine great strength with lightness and good dielectric resistance. The configurations of these built-up structures are determined by the specific design of the apparatus.

It has been found that polyvinyl alcohols, which are commonly produced by hydrolyzing polyvinyl esters to a selected degree, have properties which render them exceedingly valuable for rapidly bonding porous or absorbent materials into predetermined structures. The various modes of hydrolyzing polyvinyl esters are known in the art, and they need not be described in detail herein. For the purpose of this invention, the degree of hydrolysis of a polyvinyl ester is so controlled that the polyvinyl alcohol product is sufficiently soluble in an aqueous solution of ethyl or methyl alcohol to form solutions of a concentration of up to 10% or stronger. Polyvinyl esters hydrolyzed from 50% to 100% meet requirements. When a small amount of water is applied to a polyvinyl alcohol, which is an equivalent of a polyvinyl ester hydrolyzed from 50% to 100%, then the polyvinyl alcohol swells and becomes tacky and cementitious.

In the specification the degree of hydrolysis is an average value, indicating the percentage of acyl groups replaced by hydroxyl groups in the aggregate. The term "polyvinyl alcohol" is intended to refer not only to polyvinyl esters hydrolyzed the specified amount but a polyvinyl product with the indicated proportion of hydroxyl groups no matter how prepared or derived.

In practicing the invention polyvinyl alcohols of various degrees of polymerization may be used. Polyvinyl alcohols of such molecular weight that 4% aqueous solutions thereof have viscosities of from 5 to 50 centipoises and higher at 20° C. may be employed successfully. Inasmuch as the viscosity of solutions of the polyvinyl alcohols is directly related to molecular weight, medium molecular weight polyvinyl alcohols form less viscous solutions and are easier to apply to members than high molecular weight polyvinyl alcohols. However high molecular weight polyvinyl alcohols give somewhat stronger immediate bonds and may be preferred on this account.

Polyvinyl alcohols to be used in practicing the invention may consist either of one single type of polyvinyl alcohol or of mixtures of different molecular weight polyvinyl alcohols as well as those of different percentages of hydrolysis. The mixtures have given particularly good results in practice. For example one composition was composed of 33 parts by weight of a 77% hydrolyzed polyvinyl alcohol and 67 parts of a 46% hydrolyzed polyvinyl alcohol—the average hydrolysis being 56%. Both polyvinyl alcohols in this example were of a high molecular weight (a 4% aqueous solution having a viscosity of 50 centipoises at 20° C.). Another composition which has proven successful in use was prepared by mixing 50% by weight of a medium molecular weight (15 to 25 centipoises at 20° C. for a 4% aqueous solution thereof) 87% hydrolyzed polyvinyl alcohol and 50% by weight of a high molecular weight (45 to 55 centipoises at 20° C. for a 4% aqueous solution thereof) 46% hydrolyzed polyvinyl alcohol. The combination had an average hydrolysis of 66%.

For application to members the hydrolyzed polyvinyl esters are dissolved in solvents composed of ethyl or methyl alcohol and water, though in some instances, longer carbon chain aliphatic alcohols and water may be suitable for this purpose. For a polyvinyl ester of an average hydrolysis of from 50% to 75%, a water solution containing 50% ethyl alcohol (or methyl alcohol) has been found to be satisfactory. For this purpose solvents composed of from 30% to 60% of the ethyl alcohol in water may be employed. Mixtures of both of these monohydric alcohols and water are likewise suitable for dissolving polyvinyl alcohol.

The materials which have been found to cooperate most effectively with the polyvinyl alcohol adhesive are those that have a porous or absorbent structure. Such materials as kraft paper, cardboard, press board (also known as Fuller board), cloth, glass cloth and varieties of wood have been bonded successfully with the polyvinyl alcohol adhesive. In most cases porous base material is employed in sheet form.

For electrical apparatus, press board, and similar material made into laminated members is commonly employed because it possesses good electrical properties, such as high dielectric strength and resistance. Furthermore, press board has high mechanical strength.

A 5% to 10% solution, for example, the concentration not being critical, of polyvinyl alcohol in a solvent composed of the aqueous solution of monohydric alcohol may be applied to sheets of any of the porous materials hereinbefore set forth with a brush, a doctor blade, by passing the material under pasting rollers, by sprinkling or by the use of other well known methods of applying adhesives to materials. After the application of a suitable amount of a coating of the polyvinyl alcohol to the porous material, it is dried either by exposure to the atmosphere or in ovens, or the like. When the treated porous material is dry it carries a hard non-tacky surface coating of a polyvinyl alcohol. The dry coating of polyvinyl alcohol has the appearance and hardness of a glaze. Materials so prepared can be stored indefinitely if not exposed to the elements or water. Normal atmospheric humidity has little or no effect and the materials, usually made in sheets, may be stored under cover in stacks or in rolls without sticking to each other and without deterioration of the polyvinyl alcohol coating occurring.

The members pre-coated with polyvinyl alcohol may be made use of in rapidly building up structures therefrom by simply applying a small amount of water to the polyvinyl alcohol coating thereby causing it to become tacky and cementitious, then applying the tacky polyvinyl alcohol surface to a porous or absorbent member and applying a pressure of from about 100 to 300 pounds or higher, per square inch of adhesive surface to cause an intimate contact between the polyvinyl alcohol coating and the surfaces of the porous or absorbent member. During such contact the polyvinyl alcohol almost immediately becomes extremely viscous due to loss of water and a bond is produced having a high proportion of its ultimate strength. Pressure can be taken off in one second or less. No heating is required.

Referring to the figures of the drawings, Fig. 1 is a view of a dried coated member 10. The member 10 comprises a base 12 of a porous material, such, for example, as press board. Upon one surface of the press board member 12 is the dry, hard, glass-like coating 14 of polyvinyl alcohol.

The member 10 of Fig. 1 is preferably made from a large sheet of press board or the like prepared beforehand by coating the sheet with a solution of polyvinyl alcohol, drying and cutting it up into suitably shaped blocks such as 10. Saws, shears or punch presses may be used in preparing blocks of selected shapes from the sheet.

An alternative expedient is to cut a large sheet of material into predetermined shaped blocks and to coat these blocks individually with the solution of polyvinyl alcohol and drying. The blocks 10 may be stored indefinitely for subsequent use provided that they are not exposed directly to the elements.

In the same way as member 10 was prepared, large strips or sheets of cellulosic materials may be prepared, but without cutting until required for use. Such sheets may be stacked or rolled for ease in transportation and storage. The polyvinyl alcohol will not cause inadvertent sticking even when exposed to humid atmospheres.

When it is desired to prepare a laminated structure comprising a plurality of flat members, such, for example, as is shown in Fig. 2 of the drawings, a number of the coated dried members 10 similar to that shown in Fig. 1 may be withdrawn from stock or prepared at the time. The polyvinyl alcohol coating 14 is wetted by the application of a small amount of water, or a water solution of an aldehyde, for example, by means of a brush or a spraying attachment. The coating 14 becomes tacky and swollen and possesses highly adhesive properties. The blocks 10 are then placed upon an uncoated sheet of press board or other absorbent material 16, in predetermined spacing with the wetted polyvinyl alcohol coating in contact with the surface. The member 10, assembled as shown in Fig. 2, may be then put in a press and pressure applied to the blocks 10 and the sheet 16 to cause an intimate contact between the polyvinyl alcohol and the sheet 16. Pressures of from about 100 to 300 pounds per square inch of adhesive surface are sufficient to effect contact and good consolidation of the whole is almost immediately attained. Only a fraction of a second is necessary in the press, and assemblies, such as 18, can be produced as fast as the press can be operated. No heating is necessary. A nearly full strength bond with the polyvinyl alcohol adhesive is obtained at once.

Alternatively, dry coated pieces 10 of predetermined shape may be placed in a template having suitably located spaces therefor, the polyvinyl alcohol coating is wetted by passing the whole under a wetting brush or by lightly spraying with water, thereby rendering the coated surface tacky, and the base member 18 applied to the tacky polyvinyl alcohol surfaces. The whole may be then consolidated under pressure in the manner above indicated.

In building up relatively thick structural members such, for example, as thick plywood boards or heavy press board, a number of large polyvinyl alcohol precoated sheets of porous base material may be stacked one upon the other and after wetting the polyvinyl alcohol coating, the whole consolidated under pressure. Referring to Fig. 4 of the drawings, there is shown a built-up member 20 composed of five layers of material. The four lowermost layers 22 may be sheets of press board with a wetted adhesive coating 24 of polyvinyl alcohol on one surface thereof. The uppermost layer 23 may be an uncoated sheet of press board. By subjecting the assembly to a pressure of from about 100 to 300 pounds per square inch for a brief period of time a well consolidated structure is produced. The assembly 20 is ready for use at once since an excellent bond strength is attained by the polyvinyl alcohol adhesive at once.

Press board tubes and spacers made in such manner are useful for separating various electrical elements from each other. In some electrical apparatus the press board structures may be subjected to various dielectric liquids when in use and the adhesive must be insoluble and impermeable to the liquid dielectric. The liquid dielectrics commonly used in transformers include refined petroleum oils and halogenated cyclic hydrocarbons. Many common adhesives are unsuitable for use in such liquid mediums since they will either soften or dissolve therein. The polyvinyl alcohol adhesive is particularly useful for this service since it is insoluble in both oils and the halogenated cyclic hydrocarbons and will be an effective bonding agent. Therefore, tubes of press board bonded together with polyvinyl alcohol adhesive are particularly useful in liquid dielectric filled transformers.

Referring to Fig. 5 of the drawings, there is illustrated a tube 26 composed of a plurality of turns of a press board sheet 28 consolidated with the polyvinyl alcohol adhesive 30 applied between turns. The tube 26 shown in section in Fig. 5 may be prepared from a sheet or roll of precoated and dried press board by means of the mechanism such as is shown in Fig. 6. The tube forming machine 32 of Fig. 6 comprises a lower spring-urged roller 34 for applying a predetermined bonding pressure upon the tube of Fuller board and an upper mandrel 36 having a diameter corresponding to the internal diameter of the tube. A sheet directing member 38 guides and turns the edge of the Fuller board to conform to the upper mandrel 36. A flat bed 40 is provided for supporting and guiding the sheet of Fuller board whereby the dry coating may be wetted prior to rolling. A plurality of spring-urged rollers 42 to insure a properly formed tube are placed about the periphery of the mandrel 36. Above the table 40 is placed a wetting brush 44 fed with a liquid medium, such, for example, as water, through tube 46, which is perforated, whereby the water may penetrate to the bristles 48. Alternately a fine spray head for spraying water on the polyvinyl alcohol has been used with success. In order to prevent the press board from sticking to the mandrel 36, a length of the end of the press board corresponding to the first complete turn about the mandrel 36 is not wetted. Otherwise a turn of uncoated paper may be initially wrapped on the mandrel 36. By this expedient the tube may be readily slipped off the end of the mandrel 36 when completed. Any number of turns of press board may be rolled into the tube. Immediately after rolling the tube may be put into use, since a nearly full strength bond is produced.

As an example of the improvement effected by the described use of the polyvinyl alcohol, a battery of tube rolling machine similar to that shown in Fig. 6 was employed for a long period of time for rolling shellac coated kraft paper into tubes. For this adhesive the mandrel 36 was heated. Kraft paper of from 3 to 5 mils in thickness was the heaviest that could be rolled satisfactorily. Due to the necessity of heating the shellac thoroughly the rate of rolling tubes was limited to 100 feet per minute.

Polyvinyl alcohol treated sheet material was rolled into tubes on one of the machines. Since the polyvinyl alcohol attains such a high proportion of its ultimate bond strength almost immediately when subjected to pressure when a coating thereof is wetted, relatively stiff press board of 10 and 15 mils thickness could be rolled into tubes and the bond strength of the polyvinyl alcohol was sufficient to hold the tube shape without the plies separating. A rolling speed of from 500 to 600 feet per minute was found to be practical and satisfactory. Tubes are now rolled by the use of the polyvinyl alcohol precoated sheets at a rate of from 15 to 25 times or more, of that of the best previous practice. One machine operating only part time now accomplishes the work of a battery of tube rolling machines using the previous adhesives. A still further advantage achieved by the present invention resides in the fact that tubes may be rapidly rolled up as required in daily manufacturing operations instead of building up beforehand a supply of various sized tubes as was required previously.

An alternative type of tube forming mechanism is shown in Fig. 7 for preparing a spirally wound tube. The tube rolling mechanism comprises a driving member 50 to which may be attached any one of a number of different sized mandrels 52 depending on the internal diameter of the tube to be made. A pressure applying roll 54 is arranged to consolidate the spiral tube formed about the mandrel 52. The pressure applying roll 54 is fitted with shaft trunnions 56 retained in a pressure applying holder 58. A source of pressure, such as a hydraulic piston (not shown) attached to holder 58 produces sufficient pressure on roll 54 to effect bonding.

One method of preparing a tube is first to wind a layer 62 of uncoated paper spirally about the mandrel 52. A polyvinyl alcohol coated sheet of material 64 is then applied about the mandrel 52 in such manner as to overlap the joints of the initial spirally wound layer. The polyvinyl alcohol on the coated strip 64 is wetted by means of the brush 66 to which water is supplied by means of the hollow core 68. When the wetted cementitious polyvinyl alcohol coating on the sheet 64 is put in contact with the external surface of the inner spiral wrapping 62 pressure from roll 54 will unite them together and give a strong bond. Thus an extremely rigid tube is prepared that can be put to use immediately.

Other methods of and machines for forming tubular structures will be obvious to those skilled in the art. These mechanisms are suitable for rolling hollow tubular structures of any desired cross sectional shape, such for example as, square, hexagonal, and so forth.

It will be noted in the examples of Figs. 6 and 7, that bonding pressure is applied by means of a pressure roll for only a fraction of a second. It has been found that pressure applied for this brief period of time to the wetted polyvinyl alcohol coating is sufficient to cause a nearly full strength bond to be effected.

The cause of such rapid and effective adhesion is not fully known. It is believed, however, that the application of the wetting medium to the dried polyvinyl alcohol coating causes the coating to become tacky, swollen, and a considerable decrease in viscosity develops. Under the pressures exerted by rolls or by presses, the tacky and swollen polyvinyl alcohol coating penetrates into crevices and spaces in the contacting uncoated surfaces of porous material and readily accommodates itself to the fibers and the surface configuration thereof. Under these circumstances, coupled with the nature of the water and polyvinyl alcohol relationship, the water appears to be withdrawn instantly from the polyvinyl alcohol by absorption by the contacting surface and the viscosity of the polyvinyl alcohol increases greatly in a brief period of time. The polyvinyl alcohol then becomes so viscous that it has a resistance to disruption greater than that of any paper product tested.

Tests of the bonds produced by the polyvinyl alcohol on cellulose material, such as press board, have resulted in the press board failing, but not the bond, even when the test is performed immediately after bonding. With further drying the bond strength will increase to some extent.

For some purposes, it may be desirable to apply the polyvinyl alcohol solution to porous material as a discontinuous or non-uniform layer. Apparatus for applying this solution in such a manner is shown in Fig. 8. The sheet of porous material 72 is produced with four strips 74 of polyvinyl alcohol by the solution conveying rolls 78, which are preferably of some elastic material, such as rubber. A driving shaft 76 causes the rolls 78 to rotate and to apply the adhesive to the member 72. The bottoms of the rolls dip into a trough (not shown) containing the polyvinyl alcohol solution. The member 72 of Fig. 8 prepared with the discontinuous coating of adhesive is useful in building laminated structures for application to transformers and other liquid dielectric filled apparatus. The oil and dielectric impermeable polyvinyl alcohol adhesive would normally prevent penetration of the liquid dielectric transverse to the coated surface of the material. By applying the adhesive in strips, the liquid dielectric will rapidly penetrate in a direction transverse to the coating surface and improve the dielectric characteristics of the porous material in this case.

Referring to Fig. 9 of the drawings there is illustrated a graph of the immediate bond strength of polyvinyl alcohol bonded joints made as herein disclosed, plotting bond strength against the percentage of hydrolysis of the polyvinyl alcohol. The tests were made within 10 seconds of applying pressure to the joints. It will be apparent that a sudden and unexpected increase in bond strength begins at 50% hydrolyzed polyvinyl alcohol and a peak of about 90 pounds per square inch is reached at a 55%–60% hydrolysis value. Thereafter the immediate bond strength diminishes linearly with increased hydrolysis to about 65 pounds per square inch at 100% hydrolysis. Below 50% hydrolysis the bond strength drops abruptly to a value of less than 20 pounds per square inch at 35% hydrolysis.

The graph of Fig. 10 plots the ultimate or the maximum attained bond strength against the percentage of hydrolysis of polyvinyl alcohol, the bond being prepared as disclosed herein. By comparing Figs. 9 and 10 it will be apparent that about half of the ultimate bond strength is immediately attained on applying pressure with 60% hydrolyzed polyvinyl alcohol. This high proportion of the ultimate strength renders it feasible to make laminated tubes, as well as other structures, from heavy, deformation resisting press board and other materials. The high immediate bond strength prevents rupture or separation of plies when pressure is released.

By comparison shellac and other conventional adhesives have been applied in a manner similar to the polyvinyl alcohol and it has been found that the immediate bond strength following a one second pressing is negligible and insufficient to hold heavy, stiff sheets in predetermined shape.

Figs. 1 to 8 of the drawings illustrate the feature of precoating at least one surface of two adjacent surfaces of fairly thick members being consolidated. In some cases it has been found that this is not necessary. For some purposes a more expedient method is to precoat both sides of a thin, strong sheet of paper or cloth or the like, three to five mils thick, for example, with the polyvinyl alcohol, and dry the coated sheet in an oven. The coated sheet is rolled up and stored in rolls for subsequent use.

If a tube, such as that of Fig. 5 is to be prepared, the workman, after selecting a fresh, uncoated Fuller board or cardboard sheet of the proper width, inserts the sheet in the Fig. 6 mechanism and rolls a single turn upon mandrel 36. The prepared roll of coated thin sheet is wetted and placed on the surface of the unrolled portion of the uncoated cardboard or Fuller board. The thin coated and wetted sheet may be made to cover all of the one surface of the uncoated board or it may be placed in longitudinal strips or in any configuration desired. The rolls 34 and 36 are then set in motion to roll up the remainder of the cardboard or Fuller board with the result that the wetted, coated sheet bonds the tube laminations as effectively as the Fig. 6 type of adhesive coating.

In all of the examples of Figs. 1 to 8 a separate, wetted sheet of thin material carrying a polyvinyl adhesive on both sides thereof may be substituted for the coating 14, 24, 30 and 74, respectively. The thin coated sheets are more easily prepared and handled than would be heavy sheets of Fuller board and the like.

The wetting medium which may be employed for causing the dry polyvinyl alcohol coating to become tacky and swollen, is preferably water, due to its low cost and availability. The water in this case does not change or permanently modify the nature of the polyvinyl alcohol and once it has been removed, the polyvinyl alcohol assumes its original hard state. However, the polyvinyl alcohol coating is susceptible to excessive moisture, and softening thereof may occur under conditions of extreme wetness. In transformers and other electrical apparatus which are dried out before use, this consideration does not apply.

In order to prepare a polyvinyl alcohol adhesive which is not sensitive to excessive moisture, a wetting agent of an aldehyde or other polyvinyl alcohol reactant may be used to both wet and modify the chemical characteristics of the coating. The function of the aldehyde solution as the wetting medium, for example, is to convert the polyvinyl alcohol to a water insoluble acetal. After drying the coating will not soften when water is applied.

For electrical insulation to be exposed to the atmosphere, 50% to 75% hydrolyzed polyvinyl alcohol is preferred to a higher degree of hydrolysis since the moisture sensitivity and absorption is lower in the lower degrees of hydrolysis.

The polyvinyl alcohol in the above examples constitutes substantially all of the adhesive agent. For certain purposes, a less expensive polyvinyl alcohol adhesive composition containing a dispersion of adhesive solids, such as glue, starch, or dextrin, has been used with satisfactory results with water as a wetting medium. Preferably, these additional ingredients should not exceed the amount of polyvinyl alcohol present. When employed in the same manner as polyvinyl alcohol alone, the modified adhesive bonds as quickly under pressure but does not give as high immediate test results. Complete drying will result in bond strengths comparable with those resulting from polyvinyl alcohol alone.

While the above disclosure has been directed toward applying a coating of polyvinyl adhesive to one surface alone, it can obviously be applied to both surfaces of a joint in the same manner. Consolidation under pressure in this latter case also bonds the joint.

In some instances, other materials than the cellulosic materials or porous materials above disclosed may be bonded by means of the polyvinyl alcohol adhesive. Metals may be bonded to porous absorbent substances, such as wood or paper. In this particular application, the metal surface is roughened and rendered grease-free. A coating of polyvinyl alcohol solution is applied to the rough metal surface and dried. Thereafter, upon wetting the dry polyvinyl alcohol coating, the adhesive becomes tacky and the metal may be applied to the porous material and a bond effected under pressure. Other materials which do not have any porosity or absorbent characteristics may be bonded to porous and absorbent materials in the same manner.

Porous and absorbent materials of other types, such as porous refractory members and the like, respond to the bonding function of the polyvinyl alcohol adhesive as herein disclosed.

This invention, accordingly, represents an advance over the prior art in that it does not require simultaneous application of both pressure and heating for a considerable period of time to cause a firm bond between pieces of material carrying adhesive. Ordinarily the bonding operation is so rapid that heating is not significantly effective on the materials being consolidated.

In the claims, when the terms "structure," and "laminated structure," are employed, these terms are intended to apply to structures built up from a single sheet of material disposed in superimposed layers as well as a plurality of separate sheets of material bonded together.

Since certain obvious changes may be made in the above procedures and different embodiments of the invention could be made without departing from the scope thereof, it is intended that all matter contained in the above description or taken in connection with the accompanying drawings, shall be interpreted as illustrative and not in a limiting sense.

I claim as my invention:

1. A structure comprising in combination a plurality of layers of fibrous material disposed in contact with one another to provide a structure of predetermined shape, and an adhesive bonding the layers of fibrous material, the adhesive composed of polyvinyl alcohol derived from a polyvinyl ester hydrolyzed not less than 50%, the polyvinyl alcohol adhesive having penetrated through one surface of the contacting layers of fibrous material to a substantial depth as the result of the application of a solution of the polyvinyl alcohol and being bonded to the opposed contacting layer, after the dissipation of a wetting medium, as a cementitious coating which has accommodated itself to said opposed contacting surface without substantial penetration.

2. A structure comprising in combination a plurality of layers of fibrous material disposed in contact with one another to provide a structure of predetermined shape, and an adhesive bonding the layers of fibrous material, the adhesive composed of polyvinyl alcohol derived from a polyvinyl ester hydrolyzed from about 55% to 75%, the polyvinyl alcohol adhesive having penetrated through one surface of the contacting layers of fibrous material to a substantial depth as the result of the application of a solution of the polyvinyl alcohol and being bonded to the opposed contacting layer, after the dissipation of a wetting medium, as a cementitious coating which has accommodated itself to said opposed contacting surface without substantial penetration.

3. A structure comprising in combination a plurality of layers of fibrous cellulosic material disposed in contact with one another to provide a structure of predetermined shape, and an adhesive bonding the layers of fibrous cellulosic material, the adhesive composed of polyvinyl alcohol derived from a polyvinyl ester hydrolyzed not less than 50%, the polyvinyl alcohol adhesive having penetrated through one surface of the contacting layers of fibrous cellulosic material to a substantial depth as the result of the application of a solution of the polyvinyl alcohol and being bonded to the opposed contacting layer, after the dissipation of a wetting medium, as a cementitious coating which has accommodated itself to said opposed contacting surface without substantial penetration.

4. An article of manufacture comprising, in combination, a sheet of fibrous cellulosic material and a coating of polyvinyl alcohol applied to predetermined portions of one surface of the sheet, the portions on which the polyvinyl alcohol is present comprising less than the entire surface, the uncoated portions being permeable to oils and halogenated dielectric liquids, the polyvinyl alcohol derived from a polyvinyl ester hydrolyzed not less than 50%, the polyvinyl alcohol having penetrated a substantial distance into the surface of the sheet.

5. An article of manufacture comprising, in combination, a sheet of fibrous cellulosic material at least 10 mils thick and a coating of polyvinyl alcohol applied to predetermined portions of one surface of the sheet, the portions on which the polyvinyl alcohol is present comprising less than the entire surface, the uncoated portions being permeable to oils and halogenated dielectric liquids, the polyvinyl alcohol derived from a polyvinyl ester hydrolyzed from about 55% to 75%, the polyvinyl alcohol having penetrated a substantial distance into the surface of the sheet.

6. In a rapid process of building laminated structures from heavy sheets of porous material at least 10 mils thick and coated on one surface with polyvinyl alcohol derived from a polyvinyl ester hydrolyzed not less than 50%, the steps of applying water to the polyvinyl alcohol coating to render it tacky and cementitious, superimposing a sheet having a porous surface upon the tacky polyvinyl alcohol coating and applying for a period of time of the order of one second pressure sufficient to cause the surfaces of the sheets to meet whereby the coating of polyvinyl alcohol comes into full contact with the superimposed surface and a high strength bond is immediately obtained so that pressure can be relieved without disruption of the sheets.

7. In the process of rapidly building tubular laminated structures from a heavy sheet of fibrous cellulosic material of a thickness of at least 10 mils, the sheet carrying a coating of polyvinyl alcohol on one surface, the polyvinyl alcohol being equivalent to the product derived from hydrolyzing a polyvinyl ester not less than 50%, the steps of applying water to the coating of polyvinyl alcohol to render it tacky and cementitious, rolling the sheet into a multi-ply tubular shape with portions of the uncoated surface of the sheet being superimposed on portions of the surface carrying the coating of polyvinyl alcohol, the heavy sheet resisting deformation and tending to unwind, and applying sufficient pressure for a period of time of the order of one second to bring the superimposed surfaces into contact whereby a high strength bond is immediately produced and pressure can be relieved without disruption of the windings.

8. An electrically insulating member for use while subjected to the action of fluid dielectrics comprising, in combination, a plurality of layers of a dielectric permeable material disposed in contact with one another to provide a member of predetermined shape and an adhesive insoluble in and relatively impermeable to the fluid dielectric bonding the layers of material in the predetermined shape, the adhesive being applied to predetermined portions of one surface, such portions forming less than the entire area of the surface, the uncoated areas providing for the passage of the liquid dielectric transversely through the member from layer to layer, the adhesive comprising polyvinyl alcohol equivalent to the product derived from a polyvinyl ester hydrolyzed not less than 50%, the polyvinyl alcohol having penetrated the originally coated surface of the contacting layers as the result of the application of a solution thereof and bonded to the other surface as a cementitious coating, after the dissipation of a wetting medium to render it tacky, which has accommodated itself thereto without substantial penetration.

9. In a process of building laminated structures from heavy sheets of porous material at least 10 mils thick and coated on one surface with polyvinyl alcohol derived from a polyvinyl ester hydrolyzed from about 55% to 75%, the steps of applying water to the polyvinyl alcohol coating to render it tacky and cementitious, superimposing a sheet having a porous surface upon the tacky polyvinyl alcohol coating and applying for a period of time of the order of one second and less pressure sufficient to force the porous surface against the tacky coating of polyvinyl alcohol to produce a high strength bond.

10. In the process of building tubular laminated structures from a heavy sheet of fibrous cellulosic material of a thickness of at least 10 mils, the sheet carrying a coating of polyvinyl alcohol on one surface, the polyvinyl alcohol being equivalent to the product derived from hydrolyzing a polyvinyl ester from hydrolyzing a polyvinyl ester from about 55% to 75%, the steps of applying water to the coating of polyvinyl alcohol to render it tacky and cementitious, rolling the sheet into a multi-ply tubular shape with portions of the uncoated surface of the sheet being superimposed on portions of the surface carrying the coating of polyvinyl alcohol, the heavy sheet resisting deformation and tending to unwind, and applying sufficient pressure for a period of time of the order of one second and less to bring the superimposed surfaces into contact to produce a high strength bond.

JAMES G. FORD.